Figure 3:
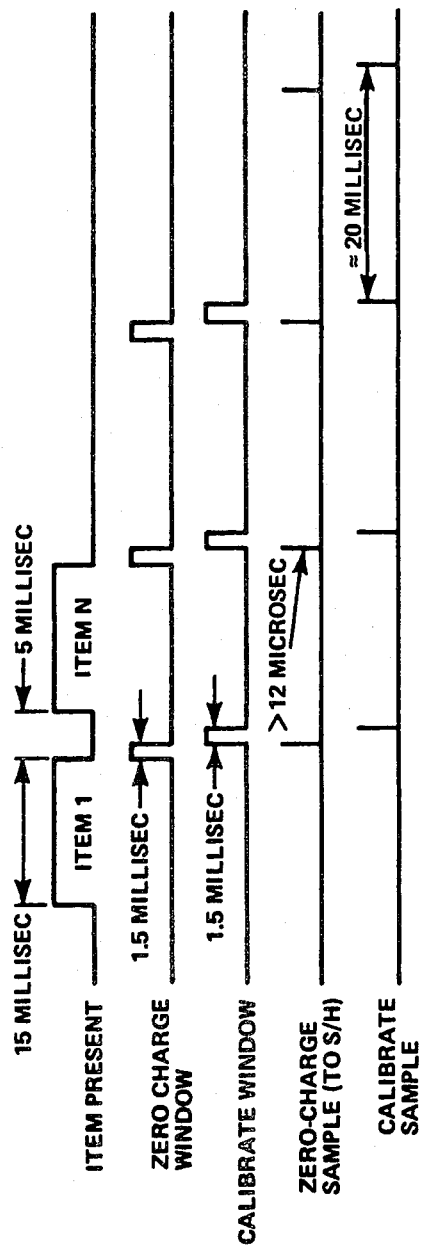

United States Patent [19]

Lovelady

[11] Patent Number: 4,470,052
[45] Date of Patent: Sep. 4, 1984

[54] A-C COUPLED, MODULATOR BASED, PHASE-ERROR SENSING FOR IJP

[75] Inventor: Kenneth T. Lovelady, Irving, Tex.

[73] Assignee: Recognition Equipment Incorporated, Irving, Tex.

[21] Appl. No.: 462,741

[22] Filed: Feb. 1, 1983

Related U.S. Application Data

[63] Continuation of Ser. No. 252,726, Apr. 10, 1981, abandoned.

[51] Int. Cl.³ ............................................. G01D 18/00
[52] U.S. Cl. ...................................................... 346/75
[58] Field of Search ............................................ 346/75

[56] References Cited

U.S. PATENT DOCUMENTS 3,569,632 10/1973 Julisburger ............................ 346/75
3,596,276 7/1971 Lovelady ........................... 346/75 X
4,288,796 9/1981 Aiba ...................................... 346/75
4,329,695 5/1982 Aiba ...................................... 346/75
4,368,474 1/1983 Togawa ................................ 346/75

OTHER PUBLICATIONS

Lee et al.; Fluid Droplet Printer; IBM TDB, vol. 16, No. 2, Jul. 1973, pp. 451-452.

Primary Examiner—Joseph W. Hartary
Attorney, Agent, or Firm—Richards, Harris & Medlock

[57] ABSTRACT

Disclosed is a drop modulator based phase error sensing circuit for use in drop-charge phase control circuitry in ink jet printers. A phase control is required to maintain the correct relationship between drop break off time and the drop charging signal. The circuit described provides solutions to the problem encountered in drop modulator based sensing.

2 Claims, 5 Drawing Figures

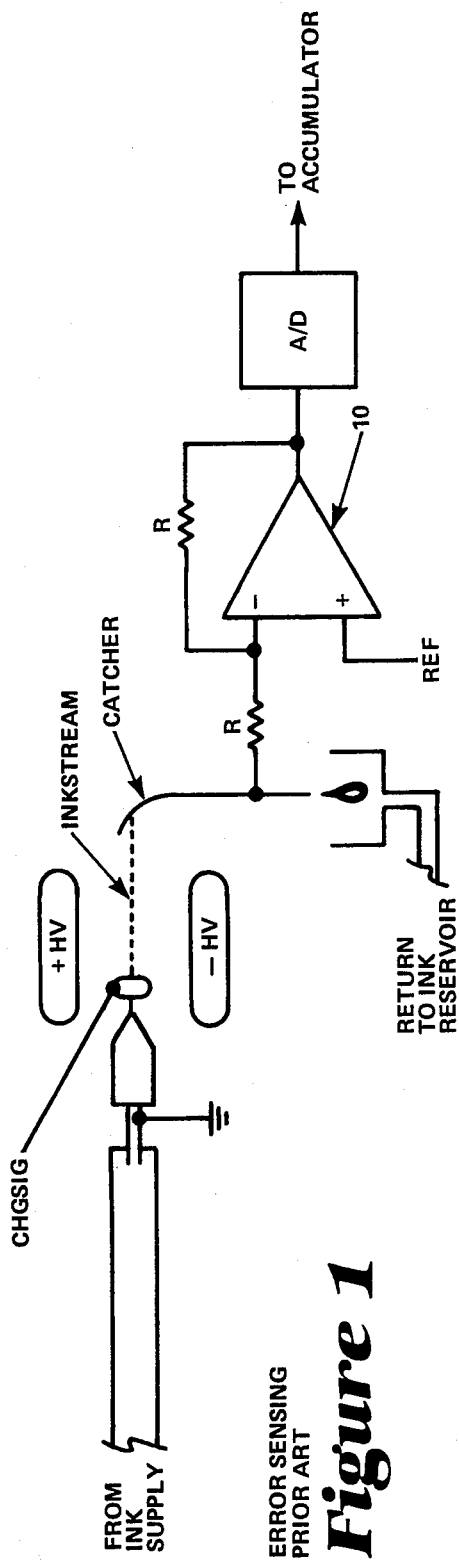
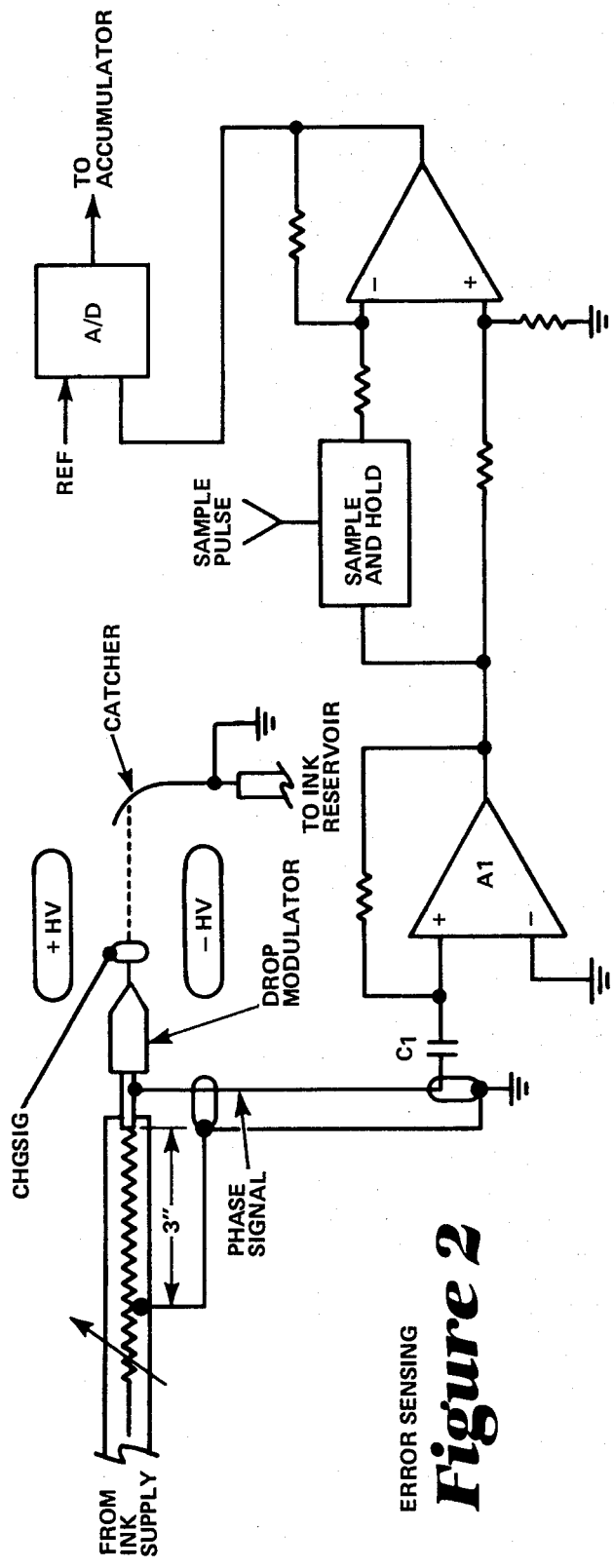

A-C COUPLED, MODULATOR BASED, PHASE-ERROR SENSING FOR IJP

This is a continuation of application Ser. No. 252,726, filed Apr. 10, 1981, now abandoned.

FIELD OF INVENTION

This invention related to Ink Jet printers and more particularly to a phase control system for use with an Ink Jet Printer.

PRIOR ART

Present day Ink Jet Printer systems require a phase control circuit to assure the proper relationship between drop breakoff time and the drop charging electrode voltage. Lack of syncronization between these two may result in printed drops being misplaced or drops hitting the catcher edge and causing troublesome splatter.

Contemporary systems sense the phase error signal at the catcher with a high impedance circuit. To maintain the high impedance, the low resistance return ink line is broken so that the ink must drip across an air gap. Any leakage paths due to ink splatter or washing solvents can easily load the error-signal on the catcher electrode, causing measurement inaccuracies. This causes phase correction errors resulting in degraded ink jet printing quality. One of the major sources of phase error measurement inaccuracies comes from ink splatter build-up bridging the catcher and one of the high voltage deflection plates. This leakage path very easily overrides the phase signal which generally may be in the vicinity of 50 nanoamp.

A typical prior art system is illustrated and described in U.S. Pat. No. 3,596,276. In the system, accurate phase control is maintained as long as there is no leakage path to override the phase signal. However, once the phase signal is incorrectly shifted due to a leakage path, then the system does not function properly.

SUMMARY OF THE INVENTION

The system of the present invention detects the phase error singal at the drop modulator instead of the catcher, and provides solutions to the problems associated with sensing at the modulator. The same current passes through the charging return path at the modulator as is sensed at the catcher. By detecting the signal at the modulator, the sensing point is physically separated from the area of ink splatter and build-up, away from the high voltage deflection plates, and the area that normally can be subjected to washing with solvent. An additional advantage is that a lower impedance sensing circuit is used which will tolerate a shunt resistance as low as approximately 4,000 ohms from the sensing electrode to ground in the event that splatter, ink leakage or washing of the modulator does occur.

THE DRAWINGS

Figure 4:
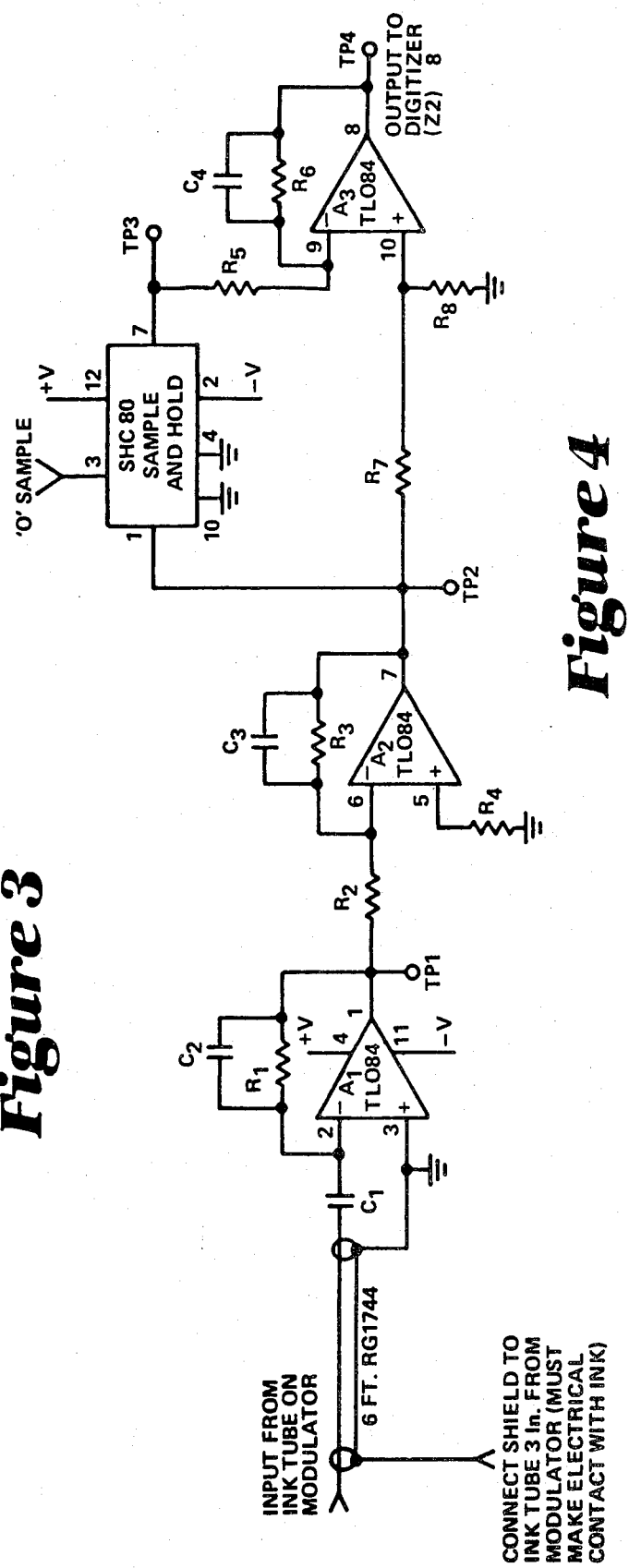
Figure 5:
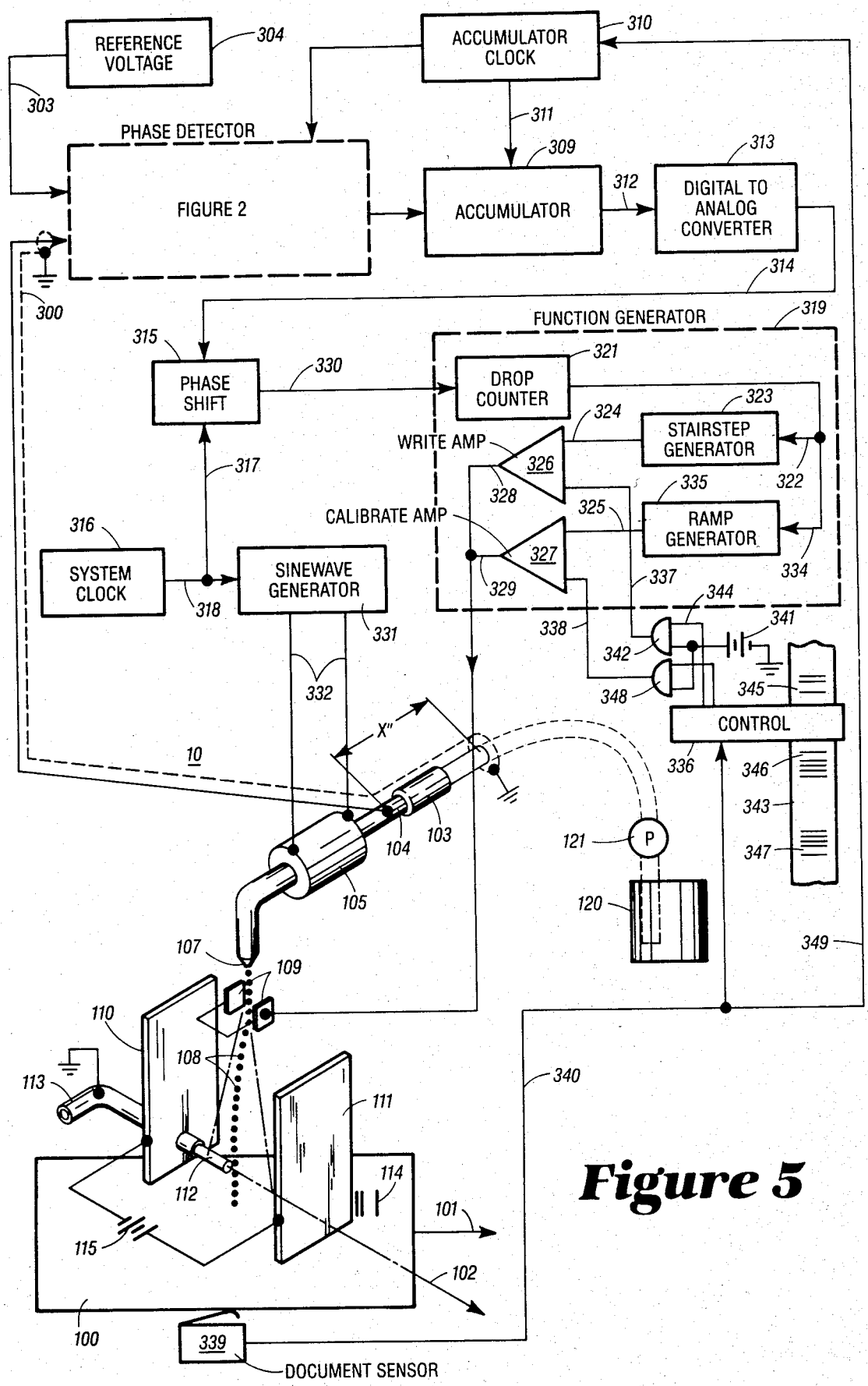

FIG. 1 illustrates a prior art Error Detector Circuit.
FIG. 2 is a simple pictorial block diagram of the Error Detection Circuit of the present invention.
FIG. 3 is a timing diagram of the system operation.
FIG. 4 is a detailed circuit diagram of the present invention.
FIG. 5 illustrates the prior art system of U.S. Pat. No. 3,596,276 illustrating the interconnection of the circuit of FIG. 2.

Referring to FIG. 1, there is shown a simple diagram of a prior art system wherein the catcher is connected to the phase sensing circuit principally the amplifier 10. This amplifier feeds the A/D converter in the phase control circuit, for example as illustrated in U.S. Pat. No. 3,596,276 (FIG. 5 in part). The catcher is near the high voltage deflection plates (HV). It is the splattering and build up between the catcher and these plates which is the primary source of phase error inaccuracies.

Looking at FIG. 2, a simplified diagram of the present invention is illustrated. The phase signal is detected at the modulator and fed through capacitor C1 to amplifier A1. The catcher may be at ground potential and is not utilized in the new phase control system. The timing diagram relating the signals of the system is illustrated in FIG. 3, and a detailed circuit diagram of the system is illustrated in FIG. 4. Capacitor C1 is a DC blocking capacitor. Amplifier A1 is a current-to-voltage converter with a low input impendence and amplifier A2 is an inverting amplifier with a gain of approximately 60. The Sample and Hold circuit stores a zero-charge reference level and differential amplifier A3 output is applied to an A/D converter.

The system corrects the phase between documents and generates a document rate clock signal when no document is being processed, as does the Prior Art system. However in the new system, at the trailing end of each document, zero charge is placed on each drop. After approsimately 1.5 ms, (the ZERO charge window time) when the signal has stabilized, a zero charge value, which is not necessarily zero volt, is stored in the Sample and Hold circuit. The calibrate signal is then applied for approximately 1.5 ms (the calibrate window time) and the mathematical difference between the zero-charge and calibrate signal is sampled, stored in the accumulator, and used to correct the phase between the crystal drive and charging plates.

Two main problems were encounted in trying to implement the modulator based sensing: 1. Electrical noise on the ink line due to ground currents from the ink system and 60 HZ pickup on the long antenna-like ink line; 2. offsets and long term DC drift of the phase error signal due to; A offset current due to amplifier A1 input offset voltage across the ink resistance; B variation in offset currents due to normal variation in ink parameters changing the ink resistance; C variation in A1 offset voltage as a function of temperature.

Four essential features are necessary for the operation of the circuit. They are the Sample and Hold circuit, the DC blocking capacitor C1, grounding of the ink line approximately 3 inches from the sensing electrode or at a point so that the impedance of ungrounded ink line is at least ten times the input impedance of amplifier A1, and isolating the crystal drive currents from the charging current return line, or using a drop rate rejection filter to remove crystal currents.

The Sample and Hold curcuit stores a zero-charge reference level which is subtracted by differential amplifier A3, from the phase-error signal at the end of the calibrate window, effectively removing inaccuracies due to low frequency drifts. These drifts are caused by amplifier A1 input offset voltage drift, loss of reference due to capacitor C1, or if C1 is not used, drift is caused by currents developed in the ink resistance due to amplifier A1 input offset voltage. The blocking capacitor C1 is used to decouple the input offset voltage from the sensing electrode not only because of the drift, but because of currents caused by the input offset voltage through potential shunt resistance of ink splatter or cleaning solvents. C1 is a large coupling capacitor and does not differentiate the phase error signal.

Grounding the ink line near the sensing electrode is required because of ground currents in, and 60 Hz pickup on the long pump-to-drop modulator ink line. A 3 inch length of tubing, with for example a 50 ohm-cm ink, results in a resistance of approximately 30K ohms to the noise elimiating ground electrode. Variations in the ink resistance during the ink life cycle does not affect the phase-error signal when working into the 400 ohm amplifier.

Removing the phase error sensor from the catcher eliminates the need to isolate the catcher from the ink reservoir and permits the use of a vacuum to draw ink away from the catcher. This allows the print head to be used in any orientation for printing.

The use of the phase error sensing from the drop modulator has a response time faster than that with the catcher sensor. The catcher must be physically purged of old ink charge before the new charge due to the calibrate signal. The minimum catcher response time is approximately 3 to 5 milliseconds with a short drip line. The response of the modulator sensing method is only electronic and is less than 1.5 ms (3 ms for zero charge and calibrate). This time may be reduced further by shortening the RC time constant, depending on the magnitude of the high frequency noise in the system. Utilizing the shorter phase sensing time, the nominal document trailing edge to the next leading edge space can be reduced allowing a higher average document throughput rate on a transport.

FIG. 5 is the circuit of U.S. Pat. No. 3,596,276, FIG. 1, redrawn to illustrate the present invention. The block labeled FIG. 2 illustrates where the circuit of FIG. 2 is connected into an ink jet printing system. The sample pulse is derived from the accumulator clock 310. The reference voltage 303 is connected to the analog-to-digital converter. One input to the amplifier A1 is the "error" signal from the ink modulator (300).

Although a single circuit has been illustrated utilizing phase correction by sampling at the drop modulator, other circuit modifications are possible which fall within the spirit and scope of the present application.

What is claimed:

1. A phase sensing and control circuit for use with an ink jet printer having a drop modulator driven by a drive current and a charging electrode driven by a charging waveform, the circuit controlling the phase relationship between the drop breakoff time and the drop charging electrode voltage pulse in an ink jet printer system, said circuit comprising:

an ink supply line for feeding ink to the ink jet drop modulator;

a charging current sensing electrode connected to the ink jet drop modulator for sensing the phase relationship signals at the ink jet drop modulator;

a DC blocking capacitor connected to said charging current sensing electrode;

amplifier means connected to said DC blocking capacitor, said DC blocking capacitor blocking offset voltages from said amplifier to said charging current sensing electrode;

means connected to the ink jet drop modulator for electrically isolating the ink from the drop modulator drive current;

means for grounding said ink supply line a distance from said charging current sensing electrode on the ink jet drop modulator so that the impedance of the ink has a resistance of approximately ten times the input impedance of said amplifier means;

a zero-charge storage circuit connected to said amplifier means for storing a zero-charge reference signal;

means connected to said zero-charge storage circuit for comparing the detected phase relationship signal and said zero-charge reference signal for generating a comparison signal; and means for applying said comparison signal to the charging waveform on the charging electrode of the ink jet printer to thereby correct the phase relationship between the drop breakoff time and the charging waveform.

2. The phase sensing and control circuit according to claim 1 wherein said zero-charge storage circuit includes a sample and hold circuit.

* * * * *

UNITED STATES PATENT AND TRADEMARK OFFICE
CERTIFICATE OF CORRECTION

PATENT NO. : 4,470,052

DATED : September 4, 1984

INVENTOR(S) : Kenneth T. Lovelady

It is certified that error appears in the above-identified patent and that said Letters Patent is hereby corrected as shown below:

Column 1, line 9 change "related" to --relates--.
Column 1, line 44 change "singal" to --signal--.

Column 2, line 39 after "the" insert --prior art--.
Column 2, line 65 after "The" insert --DC--.
Column 3, line 8 after "ohms" insert --measured from the phase sensing electrode--.

Signed and Sealed this

Twenty-eighth Day of May 1985

[SEAL]

Attest:

DONALD J. QUIGG

Attesting Officer

Acting Commissioner of Patents and Trademarks